(12) United States Patent
Brislawn

(10) Patent No.: US 6,257,528 B1
(45) Date of Patent: Jul. 10, 2001

(54) VEHICLE CONTROL SYSTEM AND METHOD EMPLOYING CONTROL SURFACE AND GEARED TAB

(75) Inventor: Mark G. Brislawn, Orange, CA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/357,185

(22) Filed: Jul. 20, 1999

(51) Int. Cl.$^7$ ........................................................ B64C 9/28
(52) U.S. Cl. ............................................ 244/211; 244/215
(58) Field of Search ................................... 244/211–215

(56) References Cited

U.S. PATENT DOCUMENTS

| | | |
|---|---|---|
| 2,174,422 | 9/1939 | Laddon et al. . |
| 2,357,465 * | 9/1944 | Focht . |
| 2,370,844 * | 3/1945 | Savis . |
| 2,395,671 * | 2/1946 | Kleinhans et al. . |
| 2,557,426 * | 6/1951 | George . |
| 2,669,401 * | 2/1954 | Bosserman . |
| 2,743,889 * | 5/1956 | White . |
| 2,843,344 * | 7/1958 | Gibb . |
| 2,859,925 | 11/1958 | Gerin . |
| 3,000,595 * | 9/1961 | Dorn . |
| 3,295,797 * | 1/1967 | Roberts et al. . |
| 3,363,862 | 1/1968 | Walter et al. . |
| 3,369,781 * | 2/1968 | Cichy et al. . |
| 3,790,106 | 2/1974 | Sweeney et al. . |
| 3,790,108 | 2/1974 | Bock . |
| 4,171,113 * | 10/1979 | Townsend ............................. 244/83 |
| 4,431,149 | 2/1984 | Brislawn et al. . |
| 4,479,620 * | 10/1984 | Rogers et al. ....................... 244/75 R |
| 4,544,118 | 10/1985 | Robinson . |
| 4,765,572 * | 8/1988 | Bellego et al. ....................... 244/178 |
| 4,962,902 | 10/1990 | Fortes . |
| 5,002,240 | 3/1991 | du Pont . |
| 5,366,176 | 11/1994 | Loewy et al. . |
| 5,538,202 | 7/1996 | Thornburg . |
| 5,639,215 | 6/1997 | Yamakawa et al. . |
| 5,779,191 | 7/1998 | Brislawn . |
| 5,823,471 * | 10/1998 | Dazet ................................... 244/75 R |
| 5,913,492 * | 6/1999 | Durandeau et al. .................... 244/82 |

FOREIGN PATENT DOCUMENTS

| | | |
|---|---|---|
| 0 109 858 | 5/1984 | (EP) . |
| 735514 | 8/1955 | (GB) . |
| 2 164 905 | 4/1986 | (GB) . |

* cited by examiner

*Primary Examiner*—Peter M. Poon
*Assistant Examiner*—Kevin Jakel
(74) *Attorney, Agent, or Firm*—Alston & Bird LLP

(57) ABSTRACT

Control systems and methods for a vehicle such as an aircraft or watercraft employ a trailing edge control surface that is pivotal about a pivot axis fixed relative to the vehicle and is deflected to create control forces, and a tab pivotally mounted to an aft end of the control surface. An aft end of a linkage is connected to the tab spaced from the tab pivot axis, and the linkage extends forward to a forward end that is coupled to fixed vehicle structure, such that deflection of the control surface causes a deflection of the tab as long as the forward end of the linkage does not lie in line with the control surface pivot axis, the in-line position defining a neutral position of the linkage. A gearing control actuator is coupled to the linkage and is operable to position the forward end of the linkage at selectively variable distances on one or the other side of the neutral position, thus providing variable gearing ratios between the control surface and the tab. Tab gearing ratio can be varied as a function of vehicle operating condition. An alternative control system includes a backup tab actuator for providing tab deflection upon failure of the actuator system that deflects the control surface. The tab can be used as a control tab for providing the motive force for moving the control surface, or the tab can be used as a mini control surface by locking the control surface in a fixed position.

15 Claims, 3 Drawing Sheets

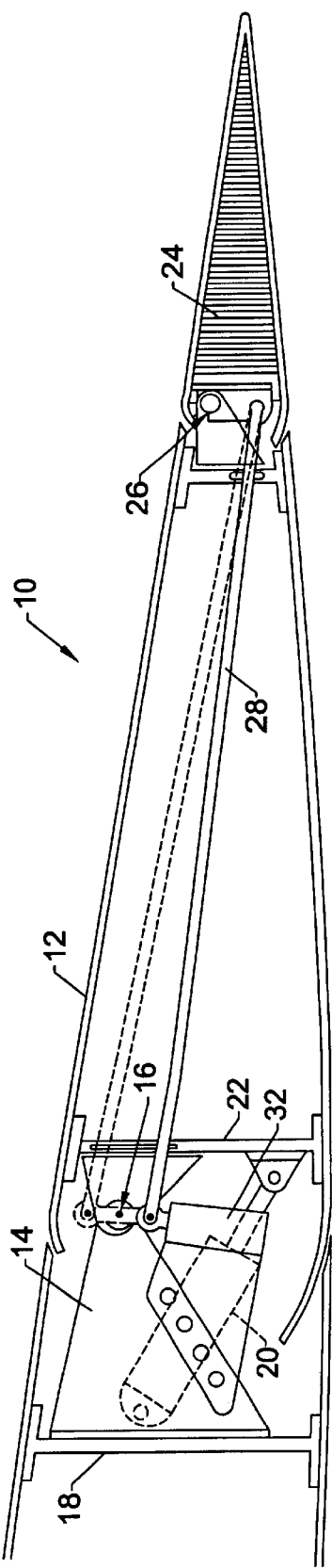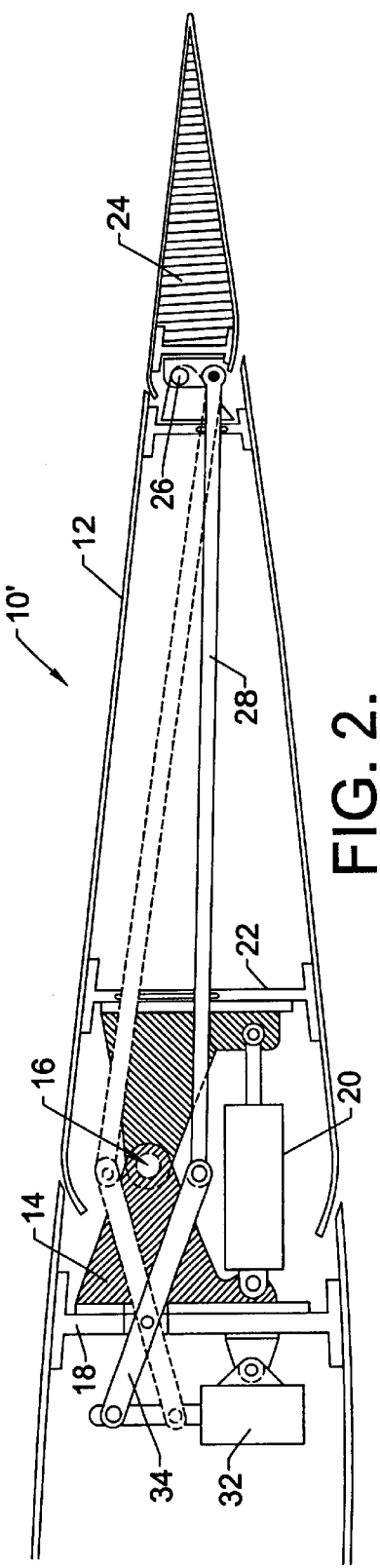

VEHICLE CONTROL SYSTEM AND METHOD EMPLOYING CONTROL SURFACE AND GEARED TAB

FIELD OF THE INVENTION

The invention relates to aerodynamic or hydrodynamic control systems and methods for aircraft or watercraft. The invention relates more particularly to such control systems and methods employing pivotal trailing edge control surfaces that include pivotal tabs for reducing hinge moments on the control surfaces and/or for increasing effectiveness of the control surfaces.

BACKGROUND OF THE INVENTION

Such tabs have been used on some aircraft for providing power to assist the movement of a control surface. For example, as shown in U.S. Pat. No. 3,363,862, an elevator is disclosed having a control tab pivotally mounted on the aft end of the elevator. The tab is mechanically linked to the pilot's controls such that the pilot mechanically moves the tab. Deflection of the tab results in aerodynamic forces being exerted on the tab, and these forces in turn cause the elevator to pivot in the opposite direction until the elevator and tab system reaches an equilibrium condition.

More recently, aircraft control surfaces have generally been actuated by hydraulic devices. In some hydraulically powered control systems, geared tabs have been used in order to reduce the hinge moments of trailing edge control surfaces. In a geared tab arrangement, a tab is pivotally connected to the trailing edge of the control surface and the tab is mechanically linked to aircraft structure such that pivotal movement of the control surface in one direction causes a pivotal movement of the tab in the opposite direction. The aerodynamic moment about the control surface hinge axis is reduced by the moment exerted by the forces on the tab. A drawback of a geared tab arrangement is that the gearing ratio between the control surface and the tab is fixed and thus cannot be optimized for all flight conditions.

This drawback was remedied in part by the development of a "reversing" geared tab for an elevator as described in U.S. Pat. No. 4,431,149 issued to Brislawn et al. The reversing geared tab described in the '149 patent provides tab deflections that are inversely proportional to (i.e., in the opposite direction to) the elevator deflection for all trailing-edge-down (TED) elevator deflections, and for trailing-edge-up (TEU) elevator deflections from zero to about 13°. This inversely proportional tab deflection reduces the elevator hinge moments and over-sensitivity for elevator deflections typical of high-speed flight. However, at 13° of elevator deflection, the tab gearing ratio changes sign so that the tab starts to move in the same direction as the elevator for TEU elevator deflections greater than 13°, resulting in the tab returning to a faired position at the maximum TEU elevator deflection of 35°. This provides normal elevator effectiveness at maximum TEU elevator deflection (i.e., no tab losses) as required for low-speed flight.

While the reversing geared tab of the '149 patent is an improvement over a non-reversing geared tab, the fixed schedule of gearing ratio provided by the reversing geared tab system is not capable of providing optimum tab hinge moment balancing over the full range of operating conditions. Furthermore, the geared tab of the '149 patent does not function as a "leading tab" wherein, for example for takeoff rotation, the tab deflection is in the same direction as and exceeds that of the elevator so as to provide increased elevator control power.

Next-generation Boeing 737 aircraft employ a reversing elevator tab that functions both as a balancing tab to reduce hinge moments in high-speed cruise operations, and as a leading tab to provide increased elevator control power for takeoff rotation. The gearing ratios in both the balancing mode and the leading mode are fixed. If hydraulic power is lost at any time, the tab automatically reverts to the balancing mode in order to minimize hydraulic power requirements.

The present invention was developed at least in part to address the unique control needs presented by the Boeing Blended-Wing-Body (BWB) aircraft that is under development by The Boeing Company. The BWB aircraft is essentially a large flying wing. To provide longitudinal stability of the aircraft, the wing requires large trailing edge control surfaces across the entire wing span, and the control surfaces must be capable of deflecting at substantially higher rates than those of moreconventional aircraft. Accordingly, the BWB aircraft presents some technical challenges in terms of providing sufficient hydraulic power to drive the control surfaces in high-speed cruise operations. Additionally, in low-speed operations, especially at takeoff, increased pitch control power may be needed beyond that which the elevator control surfaces are able to provide. A further challenge is to assure that the control surfaces can be driven as needed to provide a minimally acceptable amount of control power during a hydraulic power failure such as when all of the engines fail. The present invention seeks to provide a solution to all of these challenges.

SUMMARY OF THE INVENTION

The above needs are met and other advantages are achieved by the present invention, which provides a control system employing a reversing geared tab that, in one preferred embodiment of the invention, has a gearing ratio that can be varied between zero and a predetermined limit such that the gearing ratio can be optimized over a broad range of vehicle operating conditions. Preferably, the gearing ratio can be varied from zero down to a negative gearing ratio limit, and from zero up to a positive gearing ratio limit, so that the gearing ratio can be optimized for both high-speed and low-speed flight.

To these ends, a control system in accordance with a preferred embodiment of the invention is provided for a vehicle of the type having a trailing edge control surface mounted for pivotal movement about a control surface pivot axis fixed relative to the vehicle, and a control surface actuator connected between the vehicle and the control surface and operable to pivotally move the control surface about the control surface pivot axis. The control surface comprises a tab connected to the control surface so as to be pivotable about a tab pivot axis located aft of the control surface pivot axis, and a linkage having an aft end connected to the tab and extending forward therefrom to a forward end of the linkage. The forward end of the linkage can be placed in various positions including a neutral position in which the forward end of the linkage is in line with the control surface pivot axis, and other positions in which the forward end lies on one side or an opposite side of the control surface pivot axis. When the forward end of the linkage is in the neutral position, the gearing ratio is zero and the tab deflection is one-to-one with (i.e., the tab is faired with) the control surface. When the forward end of the linkage is moved out of the neutral position on one side or the other thereof, the gearing ratio becomes positive or negative such that a control surface deflection causes a proportional or inversely proportional deflection of the tab relative to the control surface.

For varying the gearing ratio, the control system further includes a gearingcontrol actuator connected to the linkage and operable to move the linkage so as to cause the forward end thereof to move along the path extending out of the neutral position. The gearing-control actuator is further operable to position the forward end of the linkage at selectively variable distances on at least one side of the neutral position, and more preferably on one side or the other side of the neutral position, so as to vary an effective gearing ratio between the control surface and the tab.

Preferably, the control system includes a gearing controller operatively connected to the gearing-control actuator and operable to control the gearing-control actuator so as to vary the gearing ratio as a function of vehicle operating condition. Thus, for example, the gearing ratio can be varied as a function of aircraft Mach number, altitude, and/or other parameters. In this way, the tab gearing ratio can be adjusted to maximize aerodynamic control power by optimizing the combination of control surface and tab deflections while using 100 percent of the available actuator hinge moment capability. Where the gearing ratio is a function of Mach number and altitude (i.e., airspeed), the repositioning rate of the tab control linkage is relatively low, and thus the gearing control actuator can be electric if desired; alternatively, the gearing control actuator can be hydraulic or pneumatic.

As another feature enabled by the invention, the gearing can be made a function of how much actuation power is available. For example, where a control surface is actuated by multiple actuators, the gearing ratio can be made a function of how many of the actuators are properly functioning, such that if one or more of the actuators fail, the gearing ratio can be adjusted to reduce the net control surface hinge moments to stay within the capability of the remaining functioning actuators. The gearing controller can comprise an on-board computer, which can be programmed with suitable logic to accommodate both normal operations where all systems are properly functioning, as well as various failure modes.

In accordance with an alternative preferred embodiment of the invention, which can be used with or without the aforementioned components providing variable gearing ratio capability, a control system includes a tab and linkage as described above, and further includes a backup tab actuator coupled to the linkage or to the tab and operable to pivotally move the tab during a failure of the control surface actuator. Advantageously, the system also includes a tab controller operatively connected to the backup tab actuator, the tab controller being operable to enable functioning of the backup tab actuator upon detection of a failure of the control surface actuator. Thus, when the control surface actuator fails, the tab can still be driven so as to provide continued control capability to the vehicle.

Where variable gearing ratio is desired, the control system can combine both the backup tab actuator and the gearing-control actuator as previously described. Furthermore, the gearing control actuator can be operative to position the forward end of the linkage in the neutral position upon detection of a failure of the control surface actuator such that the tab, when driven by the backup tab actuator, acts as a control tab for driving the control surface.

Alternatively, the control system can include a mechanism for preventing pivotal movement of the control surface upon detection of a failure of the control surface actuator. Accordingly, when only the tab is driven by the backup tab actuator, the tab acts as a mini control surface for the vehicle.

From the foregoing, it will be appreciated that the invention provides a vehicle control system enabling a reduction in control surface hinge moments, thus enabling a corresponding reduction in actuator sizes, hydraulic fluid quantities, and hydraulic power demands, which can be particularly advantageous for meeting engine-out control requirements. The ability to reduce hydraulic power demands also enables a greater potential to design vehicle control systems using more-common "off the shelf" actuators, including greater use of common actuator types for different control surfaces of the same vehicle. The invention also can facilitate improved low-speed control capability for a vehicle.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 1 is a sectioned side elevation of a control system in accordance with a preferred embodiment of the invention, including a variable-ratio geared tab;

FIG. 2 is a sectioned side elevation of a control system in accordance with another preferred embodiment of the invention having a variable-ratio geared tab;

DETAILED DESCRIPTION OF THE DRAWINGS

Figure 3:
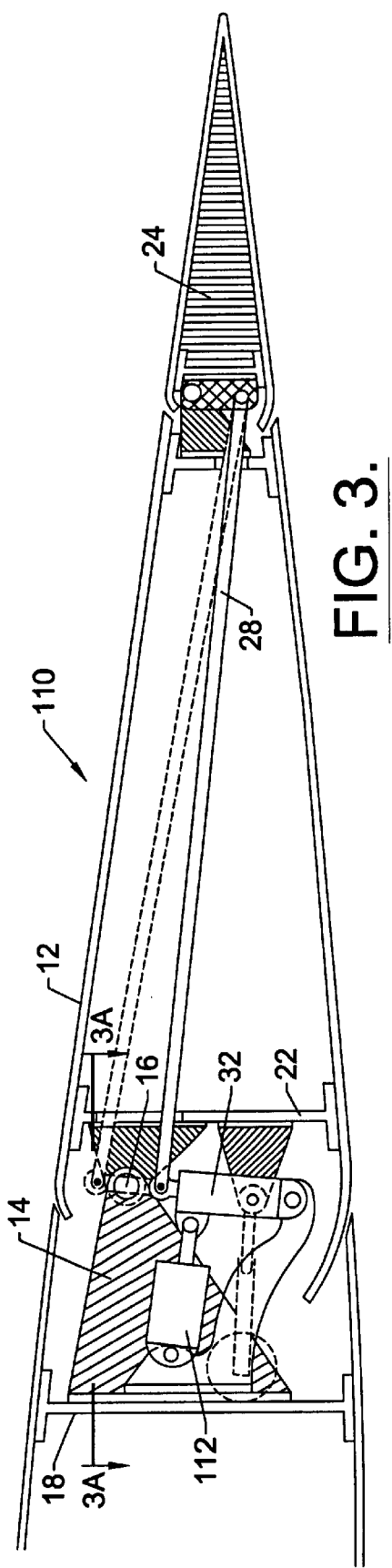
FIG. 3 is a sectioned side elevation of yet another embodiment of a control system in accordance with the invention, having a variable-ratio geared tab and a backup tab actuator for driving the tab upon failure of one or more control surface actuators.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a first preferred embodiment of a control system in accordance with the invention is broadly designated by reference numeral 10. The control system 10 includes a main trailing edge control surface 12, which can comprise an elevator, rudder, aileron, elevon, or the like. The control surface 12 is mounted to anchoring structure 14 attached to the vehicle such that the control surface 12 is pivotally movable relative to the vehicle about a control surface pivot axis 16 located generally proximate a forward end of the control surface. The anchoring structure 14 advantageously is affixed to a spar 18 forming a part of the structure of the vehicle. The control surface pivot axis 16 is oriented normal to the plane of the paper in FIG. 1 and thus appears as a single point. Accordingly, the control surface 12 can be pivotally deflected upward and downward relative to its position as shown in FIG. 1

Pivotal deflection of the control surface 12 is effected by one or more control surface actuators 20 connected between the fixed structure of the vehicle and the control surface. In the embodiment shown in FIG. 1, an actuator 20 is pivotally connected at one end to the spar 18 and is pivotally connected at the opposite end to a spar 22 of the control surface at a location spaced below the control surface pivot axis 16. Thus, extension of the actuator 20 causes the control surface 12 to be pivoted upwardly (counterclockwise in FIG. 1), and retraction of the actuator 20 causes the control surface 12 to be pivoted downwardly (clockwise in FIG. 1).

A tab 24 is pivotally attached to the control surface 12 proximate an aft end thereof, such that the tab 24 is pivotally movable relative to the control surface about a tab pivot axis 26 that extends generally parallel to the control surface pivot axis 16. A tab control linkage 28 is pivotally attached at its aft end to the tab 24 at a location spaced below the tab pivot axis 26, and extends forward therefrom internally through the control surface 12 to a forward end of the linkage 28 located proximate the control surface pivot axis 16. As further described below, the forward end of the linkage 28 is coupled to structure that remains essentially fixed relative to the vehicle when the control surface 12 is pivotally deflected. Accordingly, it will be appreciated that as long as the forward end of the linkage 28 lies in line with the control surface pivot axis 16, the tab 24 will not pivot relative to the control surface when the control surface is pivotally deflected. This in-line position of the forward end of the linkage 28 is referred to herein as the "neutral position."

The control system 10 includes features permitting the forward end of the linkage 28 to be placed in the neutral position or on one side or the other thereof in order to change an effective gearing ratio between the tab 24 and the control surface 12. More particularly, the system includes a gearing control actuator 32 that is generally fixed to the attachment structure 14 of the vehicle and has one end connected to the forward end of the linkage 28. The gearing control actuator 32 is oriented such that it extends and retracts along a direction that is generally normal to a plane containing both the control surface pivot axis 16 and the aft end of the linkage 28. Thus, extension of the gearing control actuator 32 can cause the forward end of the linkage 28 to traverse a path that extends from a lower position spaced below the neutral position as shown in solid lines in FIG. 1, through the neutral position, and to an upper position spaced above the neutral position as shown in broken lines in FIG. 1. Of course, while the terms "above" and "below" are used with reference to the orientation of the control system 10 as shown in FIG. 1, in which the control surface 12 pivots about a horizontal axis, it will be understood that the invention is applicable to other types of control surfaces that may pivot about axes oriented other than horizontal, such as rudders that pivot about vertical axes.

When the linkage 28 is moved by the gearing control actuator 32 so that it is in the lower position shown in FIG. 1, counterclockwise rotation of the control surface 12 about its pivot axis 16 causes the tab 24 to pivot about its pivot axis 26 clockwise relative to the control surface. This inversely proportional deflection of the tab is referred to herein as a "negative gearing ratio" because the tab moves in a direction opposite that of the control surface. When the gearing control actuator 32 extends to move the linkage 28 such that the forward end of the linkage 28 is in the upper position shown in FIG. 1, a "positive gearing ratio" is created, whereby the tab 24 pivots in the same direction as the control surface 12. The gearing ratio can be defined as the angular deflection of the tab relative to the control surface, divided by the angular deflection of the control surface relative to the vehicle. Thus, a zero gearing ratio occurs when the forward end of the linkage 28 lies in the neutral position, since the tab does not pivot relative to the control surface in this case.

Preferably, in accordance with the present invention, the gearing ratio can be varied between zero and a predetermined negative limit by operating the gearing control actuator 32 to selectively place the forward end of the linkage 28 in or at various distances below the neutral position. Similarly, the gearing ratio can be varied between zero and a predetermined positive limit by operating the gearing control actuator to selectively place the forward end of the linkage in or at various distances above the neutral position. The gearing control actuator 32 advantageously is capable of providing small incremental movements of the linkage 28 so as to enable an essentially infinite adjustment of the gearing ratio between the upper and lower limits. For example, a hydraulic, electric, or pneumatic actuator is suitable for positioning the linkage. A manual hand-powered mechanism could even be provided for repositioning the linkage.

FIG. 2 depicts an alternative embodiment of a control system 10' in accordance with the invention. The control system 10' is generally similar to that of FIG. 1, differing therefrom primarily in the placement of the gearing control actuator 32. Thus, in the system 10', the gearing control actuator 32 is located forward of the vehicle spar 18 and is connected to a lever arm linkage 34 that extends through an aperture in the spar 18 and is pivotally connected to the forward end of the tab control linkage 28. The lever arm linkage 34 is pivotal about a pivot point preferably located at the aperture in the spar 18, such that extension of the gearing control actuator 32 causes the linkage 28 to be moved to the lower position as shown in solid lines in FIG. 2, and retraction of the gearing control actuator 32 causes the linkage to be moved to the upper position as shown in dashed lines. In other respects, the functioning of the system 10' is substantially identical to that of the system 10 of FIG. 1.

With either of the control systems 10 or 10', the gearing ratio can be varied as a function of vehicle operating condition. Thus, for example, the gearing ratio can be varied as a function of aircraft Mach number, altitude, and/or other parameters. In this way, the tab gearing ratio can be adjusted to maximize aerodynamic control power by optimizing the combination of control surface and tab deflections to use 100 percent of the available actuator hinge moment capability. Where the gearing ratio is a function of Mach number and altitude (i.e., airspeed), the repositioning rate of the tab control linkage 28 can be relatively low, and thus the gearing control actuator 32 can be electric if desired; alternatively, the gearing control actuator can be hydraulic or pneumatic.

As another feature enabled by the invention, the gearing can be made a function of how much actuation power is available. For example, where the control surface 12 is actuated by multiple actuators 20, the gearing ratio can be made a function of how many of the actuators 20 are properly functioning, such that if one or more of the actuators fail, the gearing ratio can be adjusted to maintain hinge moments within the capability of the remaining functioning actuators. A similar adjustment in gearing ratio can be made in the event that hydraulic pressure drops below a given threshold value.

Figure 3A:
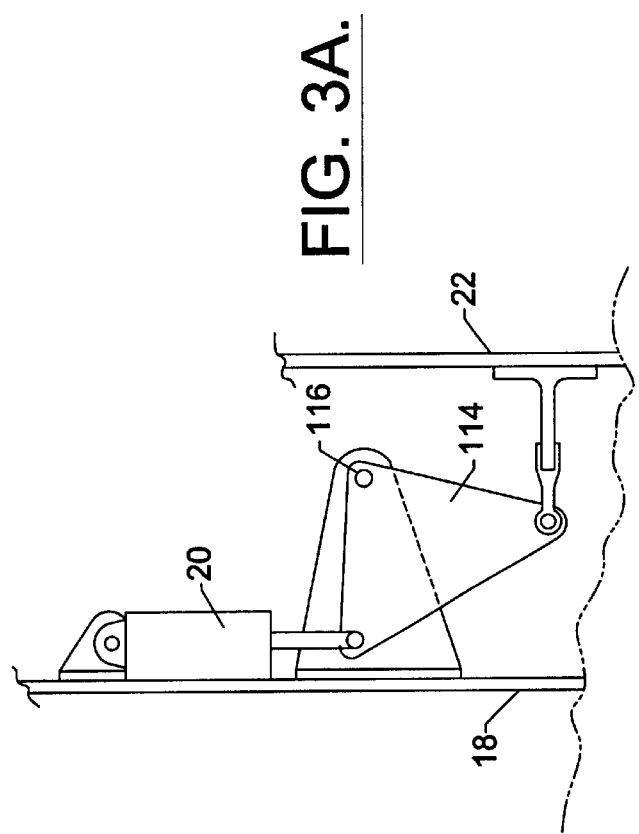
FIG. 3A is a sectioned top elevation of the control system of FIG. 3, showing the actuator for providing control surface deflection.

The invention also provides a control system having a tab backup actuation system enabling continued control capability in the event of a failure of the primary control surface actuation system. With reference to FIGS. 3 and 3A, a control system 110 is shown having a backup tab actuator 112 connected between the vehicle attachment structure 14 and the gearing control actuator 32. The gearing control actuator 32 is pivotal about its end opposite from the end connected to the linkage 28 and is oriented generally vertically and directly below the control surface pivot axis 16. The backup tab actuator 112 is operable to cause the gearing control actuator 32 to pivot forward or aft about its lower end, thus causing the linkage 28 to be moved generally forward or aft, which in turn causes the tab 24 to be deflected clockwise or counterclockwise in FIG. 3. It will be noted that the primary control surface actuator 20, as shown in FIG. 3A, extends transversely and is connected to one corner of a bell crank 114 that pivots about a pivot point 116 located at a second corner of the bell crank and has its third corner connected to the control surface 12. Of course, it will be understood that the control surface 12 can have more than one actuator 20 supplying the motive force for its movement.

Figure 4:
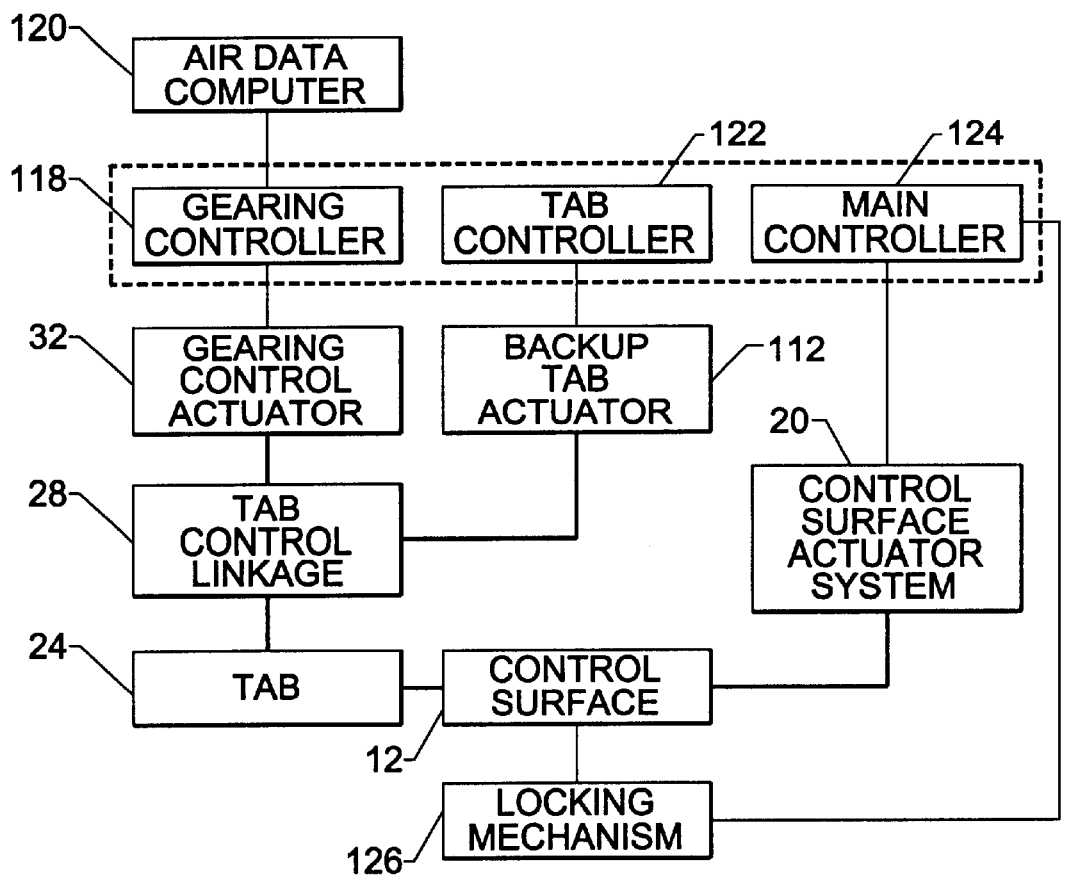
FIG. 4 is a block diagram of a control system in accordance with a further preferred embodiment of the invention.

With reference to FIG. 4, which shows a block diagram of the control system, the gearing control actuator 32 is operatively connected to a gearing controller 118, which controls the operation of the gearing control actuator 32 so as to set the gearing ratio of the tab in accordance with predetermined relationships between vehicle operating conditions and gearing ratio. For example, for an aircraft control system, the gearing controller 118 can be arranged to receive information about flight conditions, such as Mach number and altitude, from an air data computer (ADC) 120 aboard the aircraft. The gearing controller 118 can use this information to determine an appropriate tab gearing ratio and command the gearing control actuator 32 to suitably position the tab control linkage 28.

The backup tab actuator 112 is controlled by a tab controller 122, and the control surface actuator system 20 is controlled by a main controller 124. It will be recognized by those of skill in the art that any two or all of the gearing controller 118, tab controller 122, and main controller 124 can be combined into a single piece of equipment, as indicated by the dashed line box enclosing these controllers in FIG. 4, and that these controllers can communicate with one another if desired.

Upon detection of a failure of the control surface actuator system 20, which can be sensed for example by the main controller 124 or a sensor associated therewith, the backup tab actuator 112 can be activated such that the tab 24 can continue to be driven in response to signals generated by the pilot's controls. Failure of the control surface actuator system 20 can be caused by a number of events, including engine failure. The failure can be detected, for example, by sensing hydraulic fluid pressure and detecting when the pressure falls below a predetermined threshold value. In accordance with the invention, the tab 24 in such event can function in one of two ways. In a first embodiment, when a failure occurs in the control surface actuator(s) 20, the control surface 12 is allowed to pivot freely, and the deflection of the tab 24 by the backup tab actuator 112 causes the control surface 12 to be deflected in an opposite direction. The tab 24 thus functions as a control tab for providing the motive force to move the control surface 12. It is advantageous for the gearing controller 118 to command the gearing control actuator 32 to position the forward end of the linkage 28 in or at least close to the neutral position upon detection of a failure of the control surface actuator 20. It is also advantageous, where the control surface actuator 20 is a hydraulic actuator, for the hydraulic fluid path through the actuator 20 to be bypassed in the failure mode so that the backup tab actuator 112 does not have to overcome the hydrodynamic resistance that would result if the hydraulic fluid continued to circulate through the actuator 20 as the control surface 12 undergoes deflections. For this purpose, an actuatable bypass valve (not shown) can be provided in parallel with the control surface actuator 20 and can be activated during the failure mode of operation to bypass fluid around the actuator 20.

In accordance with an alternative embodiment of the invention, the tab 24 functions as a mini control surface for the vehicle. To this end, upon detection of a failure in the control surface actuator system 20 as described above, a locking mechanism 126 is activated, for example by the main controller 124, to prevent pivotal deflection of the control surface 12. If desired, the control surface 12 can be positioned in a predetermined position, such as faired with the wing or other vehicle structure to which it is attached, before being locked. Any suitable locking mechanism can be used. For example, actuatable check valves can be used in conjunction with the control surface actuator 20 so as to lock the actuator 20 at a fixed length by preventing hydraulic fluid flow into or out of the actuator 20. The invention is not limited to any particular type of locking mechanism, and those of skill in the art will recognize that various known locking mechanisms can be adapted to the present purposes. Once the control surface 12 is locked, the tab controller 122 operates the backup tab actuator 112 to pivotally deflect the tab 24 in response to signals from the pilot's controls. The tab 24 thus functions as a mini control surface.

Many modifications and other embodiments of the invention will come to mind to one skilled in the art to which this invention pertains having the benefit of the teachings presented in the foregoing descriptions and the associated drawings. For example, various types of linkage arrangements can be used for linking the tab 24 to the fixed vehicle structure such that deflection of the control surface 12 causes the tab 24 to deflect. The illustrated and described pushrod 28 is but one example of such a linkage arrangement. Furthermore, although the backup tab actuator 112 is shown as being connected to the tab 24 via the gearing control actuator 32 and the linkage 28, the backup tab actuator alternatively could be connected to the linkage 28 or directly to the tab 24. Additionally, while the described embodiments have the capability of providing variable gearing ratios in both the positive and negative gearing ratio ranges, in some applications it may be necessary to provide variable gearing in only one of these ranges, and thus the invention encompasses control systems in which the gearing control actuator 32 is operable to position the forward end of the linkage 28 at selectively variable distances on at least one side of the neutral position. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A control system for a vehicle having a trailing edge control surface mounted for pivotal movement about a control surface pivot axis fixed relative to the vehicle, and a control surface actuator connected between the vehicle and the control surface and operable to pivotally move the control surface, the control system comprising:
   a tab connected to the control surface so as to be pivotable about a tab pivot axis located aft of the control surface pivot axis;
   a linkage having an aft end connected to the tab and extending forward therefrom to a forward end of the linkage, the forward end of the linkage being movable along a path so as to permit the forward end to be selectively placed in various positions including a neutral position in which the forward end is in line with the control surface pivot axis and other positions in which the forward end is displaced from the control surface pivot axis; and a gearing-control actuator connected to the linkage and operable to move the linkage so as to cause the forward end thereof to move along said path, the gearing-control actuator being further operable to position the forward end of the linkage at selectively variable distances on at least one side of the neutral position so as to vary an effective gearing ratio between the control surface and the tab.

2. The control system of claim 1, wherein the gearing-control actuator comprises one of an electric, hydraulic, and pneumatic actuator.

3. The control system of claim 1, further comprising a gearing controller operatively connected to the gearing-control actuator and operable to control the gearing-control actuator so as to vary the gearing ratio as a function of vehicle operating conditions.

4. The control system of claim 1, wherein the gearing control actuator is operable to position the forward end of the linkage at selectively variable distances on opposite sides of the neutral position such that both positive and negative tab gearing ratios can be achieved.

5. The control system of claim 1, further comprising a backup tab actuator coupled to the linkage and operable to move the linkage forward and aft for pivotally moving the tab during a failure of a primary actuator system that moves the control surface.

6. A control system for a vehicle having a trailing edge control surface mounted for pivotal movement about a control surface pivot axis fixed relative to the vehicle, and a control surface actuator connected between the vehicle and the control surface and operable to pivotally move the control surface about the control surface pivot axis, the control system comprising:

a tab connected to the control surface so as to be pivotable about a tab pivot axis located aft of the control surface pivot axis;

a backup tab actuator coupled to the tab for pivotally moving the tab during a failure of the control surface actuator; and a tab controller operatively connected to the backup tab actuator, the tab controller being operable to enable functioning of the backup tab actuator upon detection of a failure of the control surface actuator.

7. The control system of claim 6, further comprising:

a linkage having an aft end connected to the tab and extending forward therefrom to a forward end of the linkage, the linkage being movable relative to the control surface in generally forward and aft directions so as to cause pivotal movement of the tab relative to the control surface, the forward end of the linkage being movable along a path so as to permit the forward end to be selectively placed in various positions including a neutral position in which the forward end is in line with the control surface pivot axis and other positions in which the forward end is displaced from the control surface pivot axis; and a gearing-control actuator connected to the linkage and operable to selectively position the forward end of the linkage on one side or the other side of the neutral position so as to vary an effective gearing ratio between the control surface and the tab.

8. The control system of claim 7, wherein the gearing-control actuator is operable to position the forward end of the linkage in the neutral position upon detection of a failure of the control surface actuator such that the tab when driven by the backup tab actuator acts as a control tab for driving the control surface.

9. The control system of claim 7, further comprising a mechanism for locking the control surface in a predetermined position upon detection of a failure of the control surface actuator, such that the tab when driven by the backup tab actuator acts as a mini control surface.

10. A method for controlling an aircraft having a trailing edge control surface mounted to the aircraft such that the control surface is pivotally movable relative to the aircraft about a control surface pivot axis, and having a tab connected to the control surface such that the tab is pivotally movable relative to the control surface about a tab pivot axis, the method comprising:

pivotally deflecting the control surface relative to the aircraft such that fluid forces are exerted on the control surface and tab and are transmitted to the aircraft;

pivotally deflecting the tab relative to the control surface as a proportion of pivotal deflection of the control surface, pivotal deflection of the tab divided by pivotal deflection of the control surface defining a gearing ratio for the tab; and adjusting the gearing ratio between zero and a predetermined limit as a function of operating conditions for the aircraft.

11. The method of claim 10, wherein adjusting the gearing ratio comprises adjusting the gearing ratio between zero and a predetermined negative limit for some operating conditions and adjusting the gearing ratio between zero and a predetermined positive limit for other operating conditions.

12. The method of claim 11, wherein the gearing ratio is adjusted to positive values during relatively low-speed flight conditions and to negative values during relatively high-speed flight conditions.

13. The method of claim 10, wherein the gearing ratio is adjusted as a function of at least Mach number and altitude of the aircraft.

14. The method of claim 10, wherein the control surface is pivotally moved by a control surface actuator system, and further comprising:

allowing the control surface to pivot during a failure of the control surface actuator system; and using a backup tab actuator to pivotally move the tab during said failure such that the tab controls the motion of the control surface.

15. The method of claim 10, wherein the control surface is pivotally moved by a control surface actuator system, and further comprising:

preventing the control surface from pivoting during a failure of the control surface actuator system; and using a backup tab actuator to pivotally move the tab during said failure such that the tab acts as a mini control surface for the aircraft.

* * * * *